United States Patent Office 3,308,147
Patented Mar. 7, 1967

3,308,147
HYDROXYLATED TRIMETHYLSILOXY-
SILOXANES
Charles W. Lentz, Midland, Mich., assignor to Dow Corning Corporation, Midland, Mich., a corporation of Michigan
No Drawing. Filed Aug. 28, 1963, Ser. No. 305,215
3 Claims. (Cl. 260—448.2)

This invention relates to new and useful hydroxylated trimethylsiloxysiloxanes. More particularly, this invention relates to siloxanes having the formula

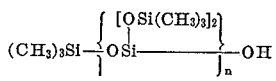

wherein $n$ is an integer equal to at least 2.

The siloxanes of this invention that are liquids are useful, for example, as liquid springs, hydraulic fluids, lubricants and heat transfer agents. Those siloxanes that are solids are useful, for example, in forming protective films on glass, wood, metals, etc. Such films can be formed, for example, by applying a solvent solution to the siloxane to the surface to be protected and allowing the solvent to evaporate. Other uses of the siloxanes of this invention will be obvious to those skilled in the art.

The siloxanes of this invention can be prepared by reacting completely trimethylsiloxylated siloxanes and aluminum chloride in substantially equimolar amounts and then hydrolyzing the resulting product. This reaction is preferably carried out below room temperature since it is exothermic and to prevent condensation of the hydroxyl groups. Most preferably the reaction is carried out at a temperature below about 10° C. The general reaction can be illustrated by the following equations:

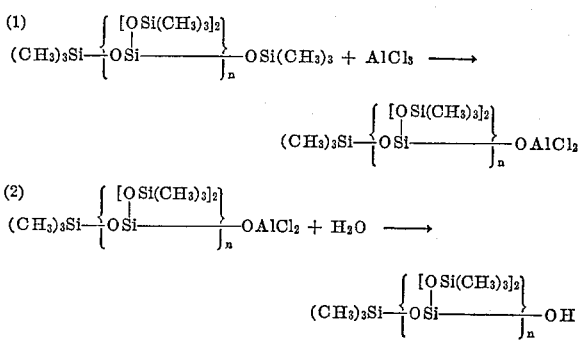

In order that those skilled in the art can better understand how the present invention can be practiced, the following examples are given by way of illustration and not by way of limitation.

Example 1

465 g. of hexakis(trimethylsiloxy)disiloxane, $$\{[(CH_3)_3SiO]_3Si\}_2O$$

was dissolved in 500 ml. of toluene, placed in a three liter flask and cooled to 2° C. Then 112 g. of AlCl$_3$ was added over a period of about 7 minutes, a maximum temperature of 9° C. being reached during the addition. The mixture was stirred an additional 5 minutes and then added to one liter of 10 percent HCl over a period of about 10 minutes, a maximum temperature of 10° C. being reached during the addition to the HCl. The solution was then washed two more times with cold 10 percent HCl (5 minutes each) and then twice with water. Finally the mixture was treated with CaO and then filtered through filter aid.

The above procedure was repeated and then the two toluene solutions obtained were combined. The toluene solution was azeotroped yielding 4 to 5 ml. of water and then stripped to remove the toluene. The remaining liquid was filtered and then fractionated into four cuts of 100 ml., 50 ml., 50 ml. and 15 ml. By gas-liquid chromatographic analysis they contained 78 percent, 72 percent, 55 percent and 51 percent, respectively, of

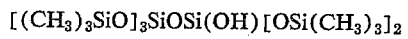

The four cuts were combined for refraction. 135 g. (about 100 cc.) of

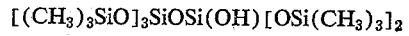

was obtained at a temperature of 88–89° C. and about .15 mm. of pressure. This compound was analyzed for percentage composition with the following results being obtained.

Theoretical, percent: C, 33.8; H, 8.44; Si, 36.8; OH, 3.19; M.W., 534. Found, percent: C, 33.9; H, 8.9; Si, 36.6; OH, 3.54; M.W., 524.

The following example illustrates a special method for preparing a compound of this invention when $n$ equals 3.

Example 2

20 g. of natrolite, Na$_2$(Al$_2$Si$_3$O$_{10}$)·2H$_2$O, ground to pass a 100 mesh screen, was slurried with water and then added to a mixture of 125 g. of ice, 150 ml. of concentrated HCl (36 percent), 300 ml. of isopropyl alcohol and 200 ml. of hexamethyldisiloxane, [(CH$_3$)$_3$Si]$_2$O, which mixture had been stirred at room temperature for one hour. Stirring was continued for one hour at room temperature after the addition of the natrolite. The mixture was then filtered and the aqueous phase separated. The siloxane phase was washed, azeotroped, and then stripped to a pot temperature of 135° C. The pot residue weighed 52.5 g. and by gas-liquid chromatographic analysis was shown to contain 30.1 percent of

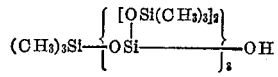

This compound was isolated and analyzed for percentage composition with the following results being obtained.

Theoretical, percent: C, 33.3; H, 8.45; Si, 37.0; OH, 2.25; M.W., 756. Found, percent: C, 33.55; H, 8.53; Si, 37.0; OH, 2.31; M.W., 692.

This compound has a boiling point of 119–121° C. at 0.1–0.2 mm. of pressure.

Example 3

When the siloxanes specified below are substituted for the hexakis(trimethylsiloxy)disiloxane in the process of Example 1, in equimolar amounts, the indicated products are obtained.

| Siloxane | Product |
|---|---|
| Octakis(trimethylsiloxy)trisiloxane | $(CH_3)_3Si\left\{\underset{\phantom{x}}{\overset{[OSi(CH_3)_3]_2}{OSi}}\right\}_3 OH$ |
| Decakis(trimethylsiloxy)tetrasiloxane | $(CH_3)_3Si\left\{\underset{\phantom{x}}{\overset{[OSi(CH_3)_3]_2}{OSi}}\right\}_4 OH$ |
| Dodecakis(trimethylsiloxy)pentasiloxane | $(CH_3)_3Si\left\{\underset{\phantom{x}}{\overset{[OSi(CH_3)_3]_2}{OSi}}\right\}_5 OH$ |
| $(CH_3)_3Si\left\{\underset{\phantom{x}}{\overset{[OSi(CH_3)_3]_2}{OSi}}\right\}_{10} OSi(CH_3)_3$ | $(CH_3)_3Si\left\{\underset{\phantom{x}}{\overset{[OSi(CH_3)_3]_2}{OSi}}\right\}_{10} OH$ |
| $(CH_3)_3Si\left\{\underset{\phantom{x}}{\overset{[OSi(CH_3)_3]_2}{OSi}}\right\}_{100} OSi(CH_3)_3$ | $(CH_3)_3Si\left\{\underset{\phantom{x}}{\overset{[OSi(CH_3)_3]_2}{OSi}}\right\}_{100} OH$ |
| $(CH_3)_3Si\left\{\underset{\phantom{x}}{\overset{[OSi(CH_3)_3]_2}{OSi}}\right\}_{1000} OSi(CH_3)_3$ | $(CH_3)_3Si\left\{\underset{\phantom{x}}{\overset{[OSi(CH_3)_3]_2}{OSi}}\right\}_{1000} OH$ |

That which is claimed is:

1. Siloxanes having the formula

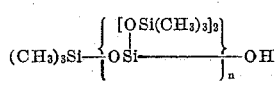

wherein $n$ is an integer equal to at least 2.

2. The siloxane

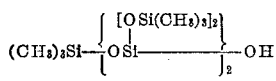

3. The siloxane

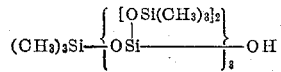

No references cited.

TOBIAS E. LEVOW, *Primary Examiner.*

P. F. SHAVER, *Assistant Examiner.*